Oct. 19, 1965  G. R. PIPES  3,212,114
MULTIPLE PART FASTENER ASSEMBLY MACHINE
Filed April 13, 1962  7 Sheets-Sheet 1

FIG. 1

INVENTOR.
GEORGE R. PIPES
BY
ATTORNEY

FIG. 2

INVENTOR.
GEORGE R. PIPES
BY
ATTORNEY

FIG. 3

Oct. 19, 1965   G. R. PIPES   3,212,114
MULTIPLE PART FASTENER ASSEMBLY MACHINE
Filed April 13, 1962   7 Sheets-Sheet 6

INVENTOR.
GEORGE R. PIPES
BY Teague & Stover
ATTORNEY

United States Patent Office

3,212,114
Patented Oct. 19, 1965

3,212,114
MULTIPLE PART FASTENER ASSEMBLY MACHINE
George R. Pipes, South Euclid, Ohio, assignor to Eaton Manufacturing Company, Cleveland, Ohio, a corporation of Ohio
Filed Apr. 13, 1962, Ser. No. 187,435
11 Claims. (Cl. 10—155)

Broadly, this invention relates to the provision of an improved fastener and washer assembly machine but more specifically, pertains to a novel washer pickup device and telescoping assembly for assembling a washer to a bolt or similar type fastener.

In the past, numerous types of machines have been utilized in the assembling of a washer to a bolt type fastener. These machines have incorporated into their mode of operation mechanisms and apparatus for feeding bolts and washers to an assembling device, telescopically assembling the washer onto the bolt and means for ejecting the assembled unit from the machine to a thread rolling unit which operates to roll a thread onto the shank portion of a bolt thereby completing the assembly.

Other types of assembling devices have been utilized which consist of providing at least two rotating wheels or discs having substantially parallel axes. The wheels have their axes so arranged that the circumference of one wheel will upon rotation carry a bolt to a predetermined position whereby a washer will be assembled to the bolt and subsequently be transferred, as an assembled unit, from the carrying wheel into a thread rolling operation or if the threads are pre-cut to a pickup hopper. Assembling operations for accomplishing the same basic purpose include such operational steps as feeding strip stock to a machine through suitable roller dies whereby the actual formation of the washer will take place subsequent to the assembly of the stock to a bolt. In this type of operation, a device is necessary to perform a telescopic locating and punching operation which, in effect, directs the bolt into engagement with the washer and subsequently punches through the strip stock to form the washer thereby effecting the completed assembly unit.

The basic problem which must be solved in each of these assembling operations is the manner by which the machine can obtain a washer from a feeding means and subsequently properly position the washer with respect to the bolt to provide an assembly of the elements. As above pointed out, the method of forming the washer subsequent to the assembly through a punching operation of sheet metal or in a telescopic arrangement whereby a bolt is gravitationally fed through the washer central opening for the assembling step are well known in the art. But in this type of operation, it is necessary to provide critically controlled synchronization between the location of the washer with respect to the bolt and the axial positioning of the opening in the washer with respect to the axis of the bolt to insure proper engagement therebetween and enable the assembly to be completed unimpaired. There are various subordinate problems to be dealt with in handling the synchronization problems which are primarily dependent on the rates of speed of these two units which carry the elements to be assembled. The rotating housings which carry the washer and the bolt respectively, must be so designed that they can readily pick up or assemble the unit in quick and highly synchronized fashion. For example, in the problem of telescoping a bolt to a washer to be secured thereto, it is necessary that the speed and feeds of these elements be such that proper alignment must occur to allow the assembly operation to take place. In the event that the feed is not consistent or interrupted, the absence of one washer or the misalignment of a series of washers may cause the machine to cease the assembling operation completely. In the case of a machine utilizing a pair of rotating wheels or discs, the elements of the machine functioning to perform the assembling operation must be positioned in a precise manner to insure proper transfer of the elements carried thereby. If a machine of this type is jarred in operation or is not set up under critically controlled standards, the axis of rotation of the wheels may become misaligned sufficiently to permanently damage or require a subsequent setup resulting in excessive down time.

To overcome some of these basic problems, the novel assembly machine presented herein operates very similar to the assembly machine disclosed in my application Serial No. 84,055, now pending in the United States Patent Office. The machine of the type disclosed in application Serial No. 84,055 is specifically designed for assembling washers to nuts and to bolts wherein the length of the shank of the bolt is not exceedingly long. However, in the assembly of a washer and bolt where the shank of the bolt is approximately 2″, the overall dimensions of that machine exceed desirable limits for available plant floor space among other setup disadvantages. Primarily then, consideration must be given to the specific type of fastener and more importantly, the overall dimensions of the fasteners. The instant machine deals with the production of an assembly of washer and bolt wherein the bolt is approximately 2″ in length. This assembly machine comprises an assembling unit which performs the function of picking up the bolt from the feed source, rotating the bolt into position whereby the washer pickup means can direct the washer, once disposed thereon onto the bolt and subsequently assemble same in the desired location on the bolt. An ejecting unit is also provided which functions to reject from the assembling operation the non-assembled units where a portion of the operational assembling step has not occurred properly. As in the disclosures of the prior art, a second wheel is utilized in this novel machine which functions in an entirely different manner from those shown in the prior art. One function of the wheel is that it is the basic means for providing a feed of the washer to the assembling machine. However, this washer feeding means need not be of the shape of a wheel but could be an arm having a suitable ramp thereon which directs the washers to an appropriate pickup point. The basic difference in the washer carrying wheel and those disclosed in the prior art is that the novel machine presented herein performs the assembly function independent of the washer carrying means.

A unique feature of the novel bolt and washer assembling machine is that the bolt length can be of any substantial dimension and still be easily aembled with a washer whereby the working area is substantially reduced when considering the overall size of the machine. From this arrangement, the requirement for valuable floor space is not increased since the height of the machine is the only factor which must be considered. This assembling machine insures proper alignment of the washer at every instance of washer pickup and further provides a single rotating assembling wheel which does not require a critically controlled synchronizing arrangement for the actual assembly operation.

Therefore, it is the principal object of this invention to provide a bolt and washer assembly device whereby the synchronization of the two elements to be assembled is independent of their feed rate and the synchronization of the elements is accomplished by a novel arrangement of cooperable parts of the mechanism.

It is another object of this invention to provide a bolt and washer assembly means incorporating into the assembly operation a novel combination washer pickup and telescoping means which insures proper washer and fastener alignment and which can be readily adjusted to assemble washers to bolts of any range of sizes without the increase of overall width and floor space required by the assembling machine.

Another object of this invention is to provide a novel bolt and washer assembling machine which incorporates therein the steps of rotating the assembling unit about a fixed cam surface effective to pick up a washer element from a suitable feeding source, axially position the bolt with respect to the washer element, telescopically place the washer in alignment with the bolt, assemble the washer to the bolt, and transfer the assembled unit to a thread roller while the washer pickup unit subsequently returns to an operating position whereby another pickup can be made in a continuous efficient operating manner and where the assembling of the washer with the bolt occurs at a rate dependent upon the number of rotating units incorporated into the axially aligned washer pickup means and bolt positioners and independent of the rate of feed of the stock to the assembling machine.

It is still another object of this invention to provide a novel bolt and washer assembling devcie where a rotating wheel or disc is utilized to transport washers from a feed source and position these washers in a manner whereby the pickup unit can readily engage the washer feed outlet.

Still another object of this invention is to provide a novel bolt and washer assembling device which is simple in operation requiring a minimum amount of adjustment which is effective to prevent excessive down time and requires a minimum of overall floor space irrespective of the overall length of the bolt which is to be assembled with a washer.

These and other objects of the invention will become more apparent from the following description taken in connection with the accompanying drawings wherein.

Figure 1:
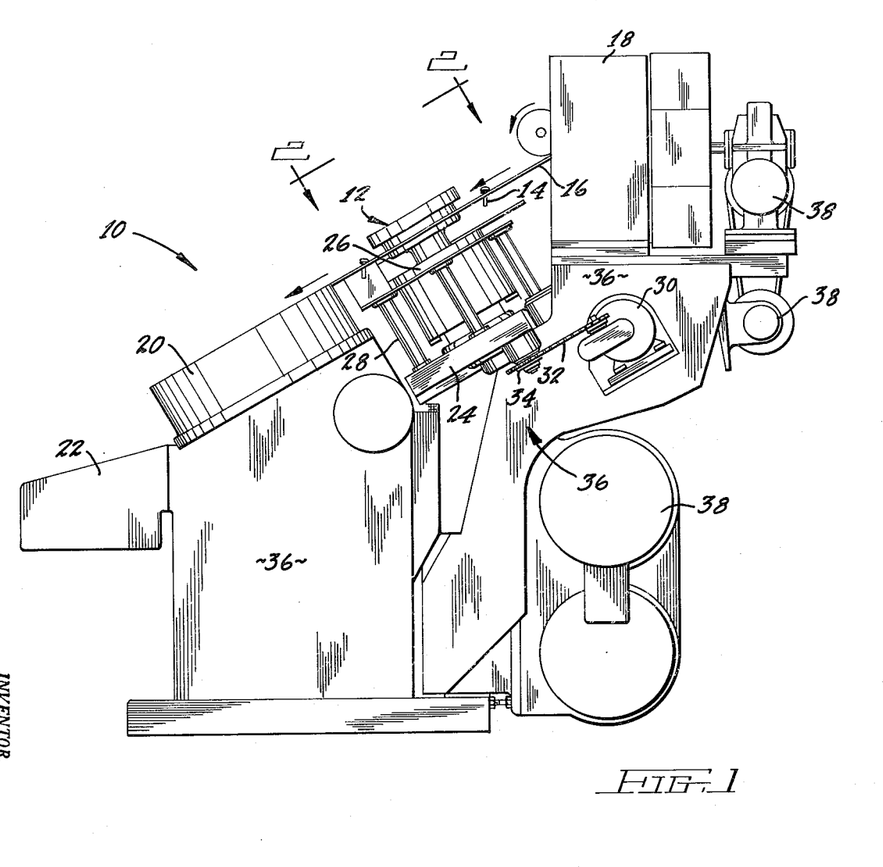
FIGURE 1 is a side elevational view of the novel bolt and washer assembling mechanism including the hopper for feeding the bolts, the assembling device, the mechanism for rotating the assembling mechanism and a thread roller which is in series arrangement with the assembling mechanism.

Referring directly to FIGURE 1 of the drawing, the novel bolt and washer assembling device 10 comprises a bolt carrying and assembling mechanism 12 which functions to position the bolt 14 received from a suitable ramp 16 extending from a hopper 18 for assembling operation with the washer. The bolt carrying and assembling mechanism 12 subsequently directs the assembled unit from the assembling portion thereof to the thread rolling unit 20 wherein the threads, as designated, are applied to the shank portion of the bolt. A hopper or container 22 is provided for collecting the completed units and is positioned at one end of the thread roller 220. The novel bolt carrying and assembling mechanism 12 comprises a rotating frame 24 which is illustrated in part in FIGURE 1. The frame 24 revolves about a stationary shaft 26 and has a series of washer and assembling pickup units 28 secured thereto. The number of washer pickup and assembly units is dependent upon the desired output rate of the machine; that is, one to nine (as shown) or greater can be utilized but it is to be understood that with each additional unit the associated problems of feeding the stock, floor space including size of the machines, and other changes must be considered. These units 28 are rotated about the shaft by a suitable motivating source 30 such as an electric motor connected to the frame 24 through a chain or belt drive 32 and pulley 34 arrangement. A housing 36 supports the rotatable units and other motivating means 38 for the various operations (which are to be described hereafter) accomplished by the device 10. The thread rolling unit 20 in like manner has a suitable actuating means (not shown herein) housed within a portion of the housing 36.

Figure 2:
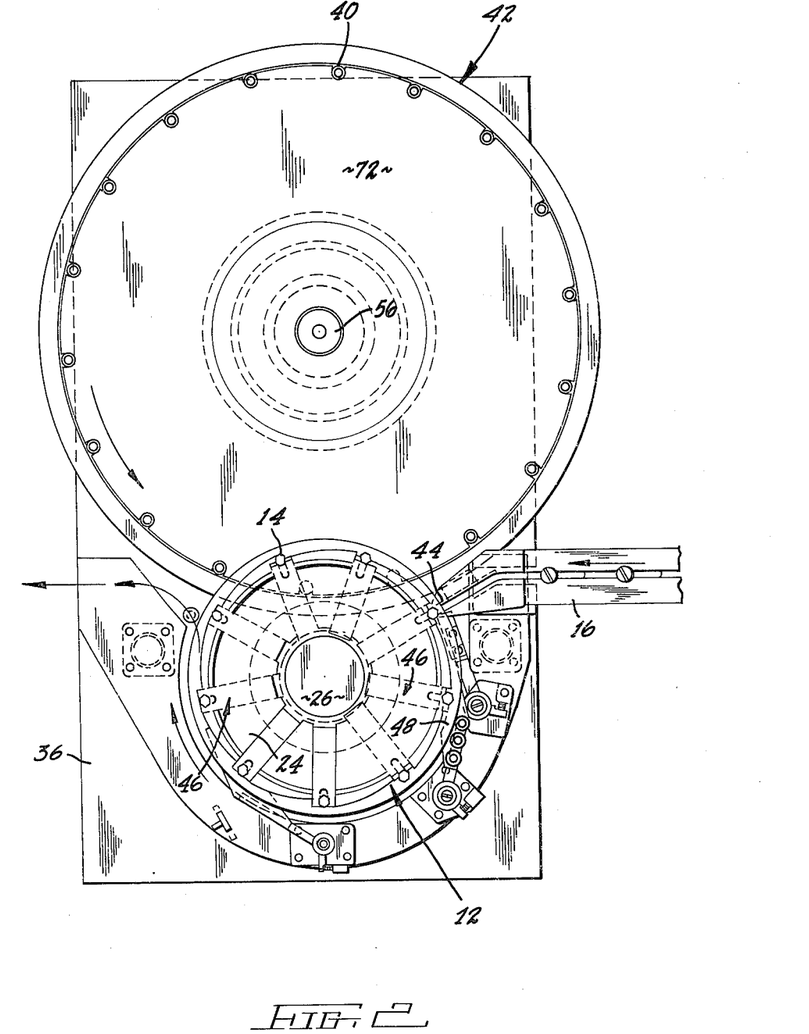
FIGURE 2 is a top elevation view of the novel bolt and washer assembling mechanism taken along line 2—2 of FIGURE 1.

The novel bolt and washer carrying device is more clearly illustrated in the top view of FIGURE 2 showing the relative location of the bolt carrying and assembling mechanism 12 with respect to the washer feeding mechanism. A suitable washer feeding source (not shown) directs the washer 40 to the washer carrying mechanism 42 which deposits a washer thereon. The bolt carrying and assembling mechanism 12 is fed bolts by a ramp 16 extending from the bolt hopper 18 and rotates in a clockwise direction, as illustrated, whereby a portion of the bolt carrying mechanism engages a bolt at the pickup point located on the end 44 of the ramp 16 at which time a bolt is transferred from the ramp to the bolt carrying and assembling mechanism 12. The stationary shaft 26 has a cam and follower arrangement on one end thereof which actuates a series of pairs of bolt carrying slides 46 radially movable on the rotating frame 24 of the bolt carrier and circumferentially spaced thereabout. A fender 48 is secured to a portion of the housing 36 and acts as a means to hold the bolt in proper position subsequent to its pickup from the end portion 44 of the ramp 16 leading to the assembling mechanism. This fender maintains proper abutment of the bolt with respect to the radially movable bolt carrying slides 46 disposed in the mechanism 12 prior to its assembly with the washer since the axis of rotation of the mechanism 12 is at an acute angle with respect to the base of housing of the device.

Figure 3:
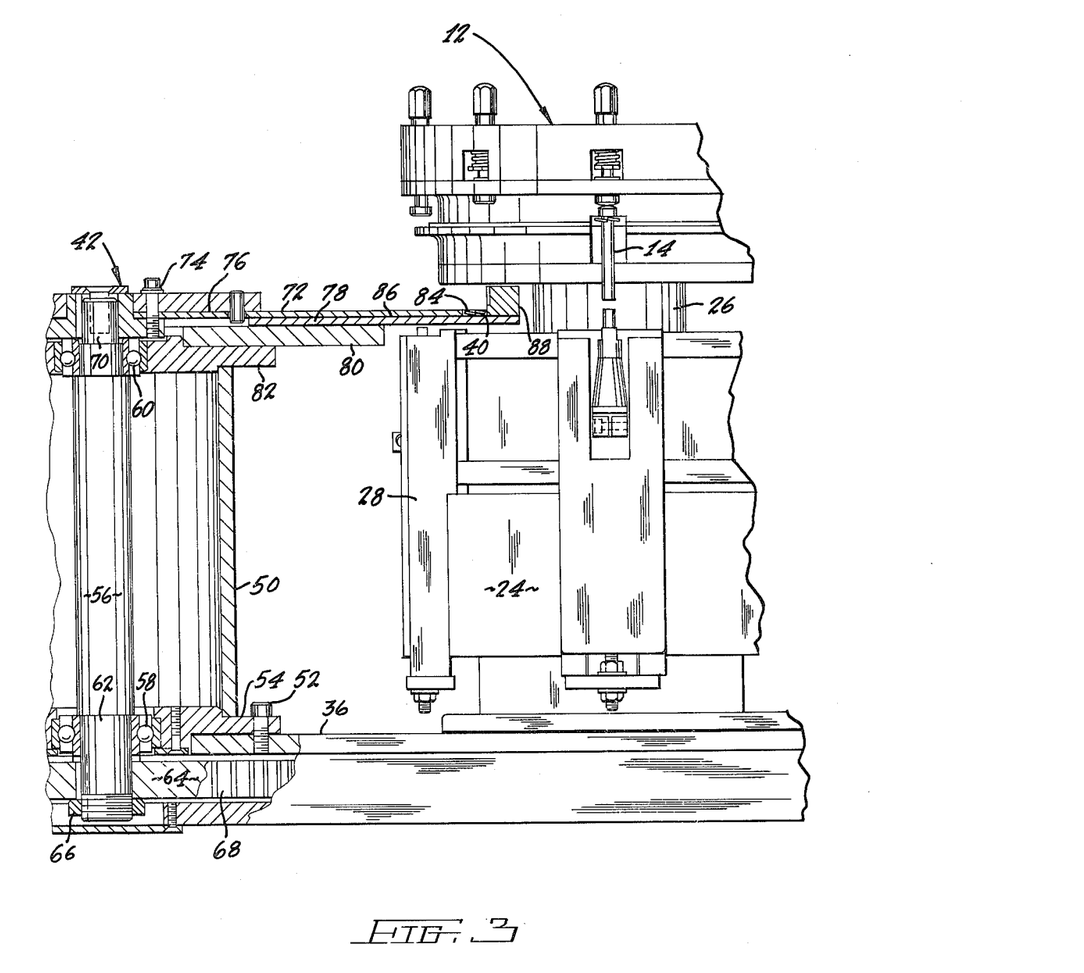
FIGURE 3 is an enlarged side elevational view of the novel bolt and washer assembling mechanism illustrating therein the washer feeding and carrying means and the bolt carrying and assembling means.

In FIGURE 3 of the drawing, the relative location of the bolt carrying and assembling mechanism 12 with respect to the washer feeding mechanism 42 is illustrated wherein the washer feeding mechanism 42 comprises a stationary frame or housing 50 fixed to the frame 36 of the bolt and washer assembling device 10 by bolts 52 or similar such fastening devices secured to an annular flange 54 extending therefrom. A rotatable shaft 56 is centrally disposed within the housing and is held for rotation therein by bearing mounts 58 and 60 disposed intermediate the shaft and the stationary housing and engageable therewith. One end 62 of the shaft 56 is threaded and is operable to receive a pulley 64 arrangement thereon secured to the shaft end 62 for conjoint rotation therewith by a nut 66 engageable with the threaded end portion. The pulley is operable to receive a driving belt 68 thereon with this belt cooperating with a similar pulley arrangement (not shown) fixed to the shaft of the bolt and washer assembling device. Both the washer feeding mechanism and the bolt carrying and assembling mechanisms are geared to one another such that the motivating power source 30 is effective to rotate the units at the same relative speeds. Remote from the pulley arrangement at one end 70 of the shaft 56 is a rotatable disc 72 secured to the shaft 56 by bolts 74 or other suitable fastening devices through an annular plate 76 disposed adjacent the disc 72. The plate 76 functions as a stabilizing means to which the washer carrying rotatable disc 72 can be effectively secured to the end portion 70 of the shaft 56. Axially disposed beneath the washer carrying disc 72 are a pair of support plates 78 and 80, respectively, secured to one another and in turn, fixed to a flange 82 extending from the stationary housing 50 whereby these support plates act as a base on which the washer carrying disc rotates. The washer carrying disc has a series of circumferentially spaced, U-shaped openings 84 thereon in which the washers 40 are receivable. The openings 84 in the washer carrying disc extend through the width of the material such that the support plate 78 acts as the axial restricting means for the washer while the rotatable movement of the disc slides the washers across a surface 86 of the support plate 78 engageable therewith. At one end of support plate 78 is a fender or retainer member 88 which acts as a means to prevent radial displacement of the washers from their respective grooves due to the acute angle of inclination of the mechanism and accordingly, maintain same within the restricted area of the U-shaped opening 84.

The diametral dimension of the washer carrying plate is such that there is an arcuate intersection of the circumferential peripheral portions of the washer carrying mechanism and the bolt carrying and assembling mechanism due to the relatively close spacing of their respective axes of rotation. A peripheral arcuate portion of the washer carrying wheel extends inwardly toward the rotating axis of the bolt carrying and washer carrying device whereby portions of each of these mechanisms overlap when rotating and their respective planes of rotation are axially spaced from one another. The bolt carrying and assembling mechanism of FIGURE 4 for simplicity will be hereinafter described with respect to one washer carrying and assembling unit.

Figures 4, 5, 6:
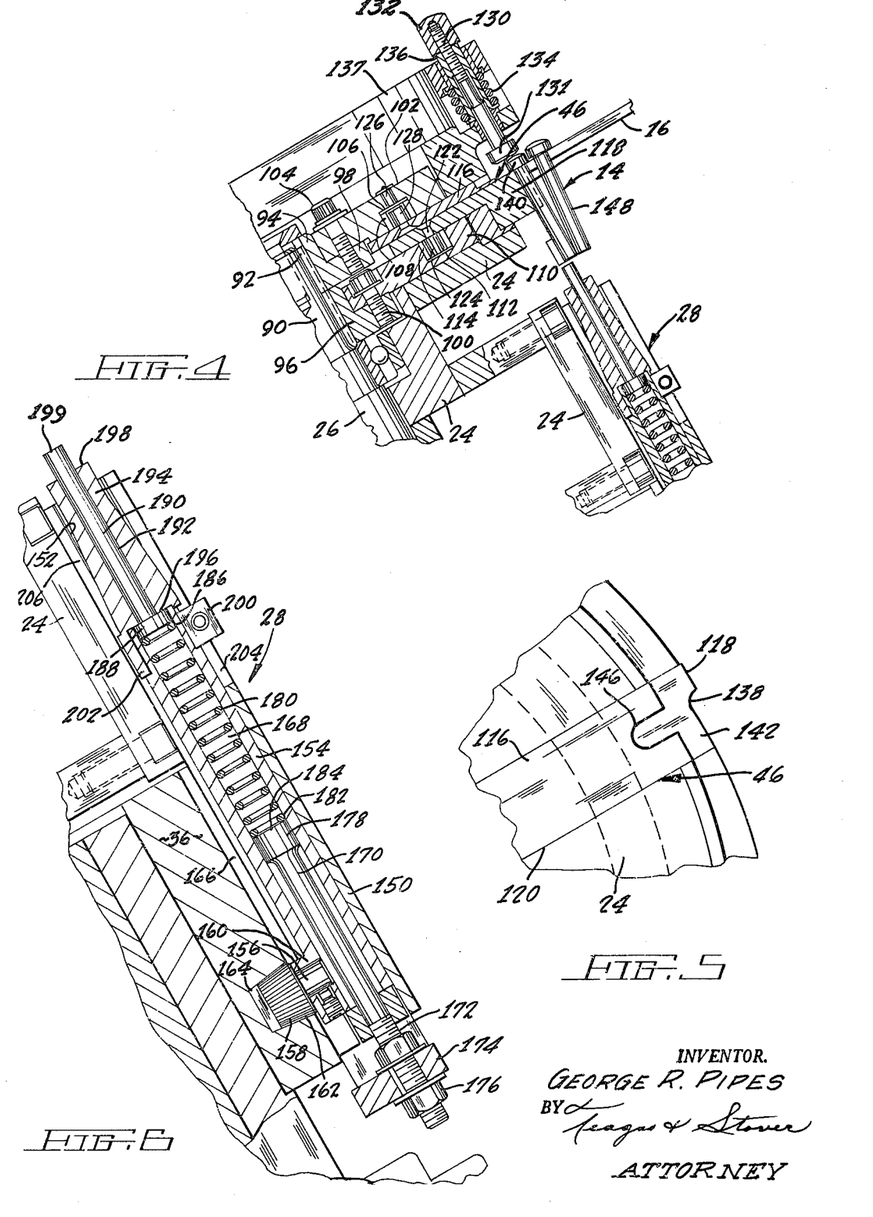
FIGURE 4 is a side elevational view of the bolt carrying means and the washer and assembling mechanism prior to the assembling operation.
FIGURE 5 is a top view of a portion of the bolt carrying means illustrating therein the combination holding and alignment means for positioning the bolt.
FIGURE 6 is a cross-sectional view of the washer pickup and assembling means illustrating therein the components of this device and the relative arrangement of the elements thereof.

The mechanism 12 comprises the stationary shaft member 26, above referred to, which is fixed to the frame 36 of the bolt and washer assembling device 10 and has at one end 90 thereof a series of splines 92 to which is cooperably keyed a pair of axially spaced sleeves 94 and 96 having flanges 98 and 100, respectively, extending therefrom. A cam plate 102 is secured to the flange 98 by bolts 104 and has an annular groove 106 therein which defines a cam surface 108. Secured to the flange 100 is a second cam plate 110 having an annular opening 112 therein which defines a second cam surface 114. Intermediately disposed between the cam plate members 102 and 110 are the pair of bolt carrying slides 46 hereinafter referred to as an upper slide 116 and a lower slide 118 disposed in a radially extending groove 120 (FIG. 5) formed in the rotatable housing 24 of the bolt carrying and assembling mechanism. A pin and roller arrangement is cooperably arranged with the lower slide having the pin 122 secured thereto with the roller 124 rotatably fixed to one end of the pin whereby the roller 124 acts as a follower along the cam surface 114 formed in the lower plate member 110. The upper slide has a pin and roller arrangement with the pin 126 being secured to the upper slide and a roller 128 being rotatably mounted on one end of the pin. The roller is disposed within the annular groove 106 formed in the upper cam plate 102 and accordingly, acts as a follower when in engagement with the cam surface 108 to provide a reciprocatory movement in the upper slide. Responsive to the rotation of the housing 24 in which the upper and lower slides 116 and 118, respectively, are disposed, the cam and follower arrangement cooperate to effect a radial movement thereto.

A reciprocable pin member 130 having head portions 131 and 132 at opposite ends thereof is spring loaded by a coil spring 134 fixed to the upper portion 137 of the housing 24 wherein the pin and coil spring combination are disposed in an axially directed bore 136 formed in the upper portion 137 of the rotatable frame 24. The pin member 130 is reciprocable within the bore 136 responsive to the positioning of the bolt 14 within a semi-circular notch 138 formed in the lower radially movable slide member 118 (FIG. 5). The lower slide upon receiving the bolt within this notch, positions the bolt such that the head 140 engages surface 142 of the lower slide and the head portion 131 of the pin and is effective to axially move the pin upwardly against the reaction of the coil spring member 134. The upper radially movable slide 116 has a cutout portion therein forming a U-shaped opening 146 of a width substantially equal to the diameter of the shank portion 148 of the bolt 14. The particular provision in the top slide and the lower slide for the respective groove and U-shaped opening as well as the provision for the reciprocation of the pin in the upper portion 137 of the rotatable housing will be described later in detail and the specific reasons therefor will be apparent when a description of the operation of the assembling device is hereinafter set forth. The location of the bolt carrying slides 46 with respect to the bolt feeding ramp 16 is such that at the time of contact or bolt pickup, the lower slide 118 is extended responsive to the pre-determined engagement of the follower roller 124 fixed thereto with the cam surface 114 whereby the end of the lower slide is extended radially to position the semi-circular notch 138 portion to enable the notch to engage a bolt disposed at the end of the ramp 16 and thereby transfer the bolt from the ramp onto the rotating frame of the bolt carrying and assembling mechanism. The notch 138 in the lower slide 118 has a radius of curvature substantially the same as that of the bolt shank and the head 140 of the bolt is disposed, upon pickup, directly on the upper surface 142 of the lower slide.

Axially spaced from and in alignment with the bolts when in engagement with the lower slide are a corresponding number of washer pickup and assembling units 28. These units (FIGS. 6) individually comprise a housing 150 fixed to the rotatable frame 24 having a chamber 152 formed thereby in which a plunger member 154 is disposed. A pin 156 and roller 158 combination is cooperable with the plunger whereby the pin is secured to an extended shoulder 160 formed from the plunger and the roller is rotatably mounted on the end portion of the pin. The roller is arranged radially inwardly with respect to the washer pickup and assembling unit axis of rotation and is free to rotate along a cam surface 162 defined by an annular groove 164 formed in the stationary frame 36 of the mechanism. The shoulder 160 is engageable with a groove 166 formed in the frame 36 and this groove functions as a guide for the axial movement of the plunger 154 responsive to the roller movement when in engagement with the cam surface 162. A chamber 168 is formed within the plunger member 54 in which a cylindrical rod 170 is disposed having a threaded portion 172 at one end thereof adaptable to be secured to a flange 174 extending from the frame 24 by a nut 176 secured to the threaded portion 172. The other end 178 of the rod 170 remote from the threaded end portion functions as an abutment or reaction point for a coil spring 180 axially spaced from the rod and similarly disposed within the chamber 168. The coil spring has one end 182 thereof in engagement with a surface 184 on the end portion 178 of the rod. The other end 186 of the coil spring 180 is engageable with a head or shoulder portion 188 of a cylindrical pin 190 which is reciprocable within a cylindrical opening 192 formed within a conically shaped end portion 194 of the plunger member. A pair of parallel lands 195 (FIG. 8) are formed on the end portion 194 of the plunger which functions to facilitate the assembly of the bolt and washer elements. The plunger end portion 194 has an inner surface 196 thereon disposed within the chamber 168 abuttable with the head portion 188 of the pin 190 and functions to restrict the axial movement of the pin within the opening 192. The pin is of a substantial length such that in a non-operation position, one end 199 of the pin which is the washer pickup end, extends a substantial distance from an end surface 198 of the plunger. The specific reason for this extension will become apparent upon further description of the unit and particularly when an operating cycle of the assembling mechanism is described hereinafter. The conical end portion 194 of the plunger has a pair of external flanges 200 and 202 extending therefrom disposed within a pair of grooves 204 in the housing 150 and 206 formed in the frame 24, respectively. These flanges 200 and 202 are cooperable with shoulder 160 operable to properly guide the axial movement of the plunger in the housing 150 relative to the frame 24 upon reciprocation thereof responsive to the roller 158 engagement with the cam surface 162 during frame 24 rotation.

The washer pickup and assembling mechanisms 28 are axially spaced from the bolt carrying slides 46 of the rotating frame 24 such that the intersection of the washer carrying wheel 72 and the bolt carrying and washer pickup and assembling units occurs at an axially spaced relationship whereby the washer carrying wheel 72 rotates on a plane intermediate the plunger end portions 194 of the washer pickup and assembling mechanisms. From this axially spaced arrangement, it can be readily seen that the washer pickup units 28 engage the washers 40 in an axially upward movement and accordingly, are so positioned on the rotating frame 24 with respect to the upper 116 and lower 118 bolt carrying slides that the washers and bolt pickup are in axial alignment for the assembling operation.

Figures 7, 8:
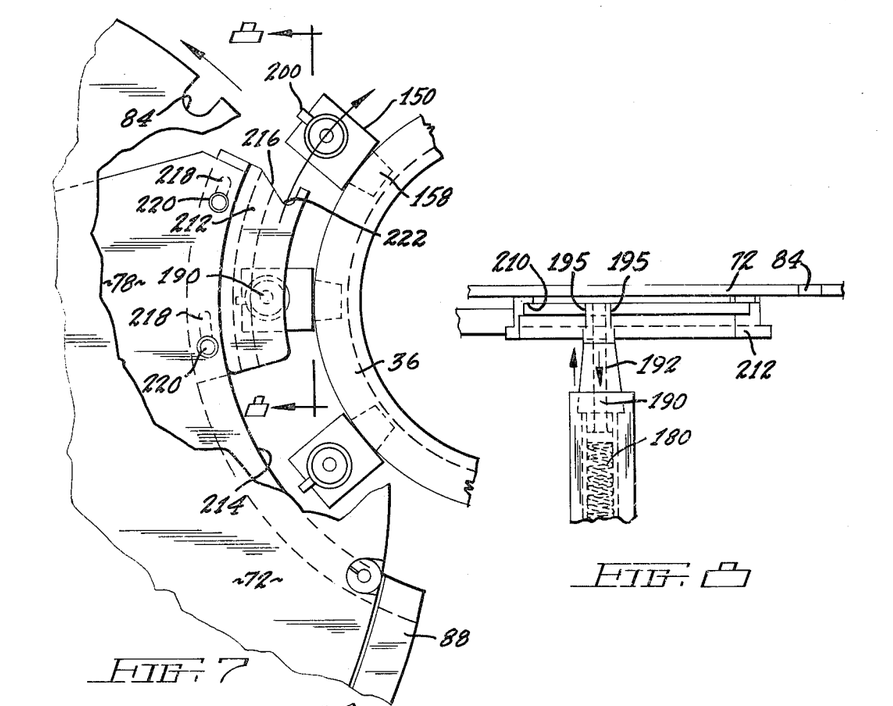
FIGURE 7 is a top elevational view illustrating a portion of the washer pickup operation prior to the actual pickup step through a cutaway view of the washer carrying means.
FIGURE 8 is a side elevational view of the washer pickup and assembling means upon engagement thereof with the washer carrying means taken along lines 8—8 of FIGURE 7.
Figures 9, 10:
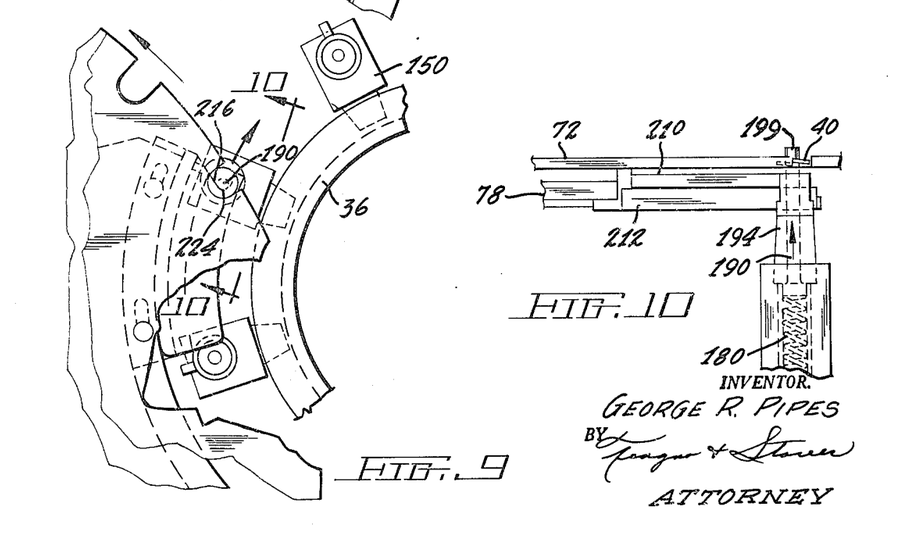
FIGURE 9 is a top elevational view showing one of the washer pickup units at the point of engagement with a washer as carried by the washer carrying means.
FIGURE 10 is a side elevational view of one of the washer pickup units taken along lines 10—10 of FIGURE 9.

In transferring the washers from the washer feeding wheel (FIGS. 7–10), the reciprocably movable pins 190 in the plungers, upon rotation of the frame are positioned for engagement with a lower surface 210 of an arcuately shaped plate 212 secured to a cutout portion 214 formed in the support plate 78 of the stationary housing 50 of the washer carrying mechanism. A notch 216 is formed in the plate 212 and the plate has a pair of openings 218 therein to which the arcuate plate is secured by bolts 220 to the support plate 78. The arcuate plate 212 has a radius of curvature substantially equal to the radius of curvature of the rotative movement of the washer pickup and assembling units about their respective axis of rotation. The radius of curvature of the cutout portion 214 in the support plate 78 is substantially equal to that of the arcuate plate and therefore, the relative arrangement of this cutout portion and the positioning of the arcuate plate therein coincides with the radius of curvature of the washer pickup and assembling units at the point of overlap in the rotation of the two mechanisms. Continued rotation of the frame 24 maintains engagement of the roller 158 with cam surface 162 formed in the groove 164 in the stationary housing 36 of the bolt carrying and assembling device whereupon at the point of initial overlap of the rotating units, a rise in the cam surface (not shown) is encountered by the follower roller 158. Upon continued engagement of the rise of the cam surface by the follower member, the reciprocable pin 190 upon abutment with the surface 210 of the plate 212 is axially moved inwardly within the opening 192 formed in the conical end portion 194 of the plunger. With continued rotation of the frame and continued rise of the cam surface, the pin is completely depressed into the opening 192 (FIG. 8). The notch 216 formed in one end of the plate 212 (FIGS. 7 and 9) has the configuration of an acute angle wherein the apex 222 of the angle is semicircular and has a radius of curvature substantially the same as the radius of curvature of the reciprocable pin member 190. At the point of engagement of the pin with the edge 224 formed by the notch 216 and the surface 210 on the plate and with a slight subsequent rotative movement of the washer pickup unit, the depressed pin reacting to the release of the compressive loading of the coil spring 180 disposed within the plunger chamber 168, instantaneously moves axially outwardly. Due to the relative directions of rotation of the washer carrying disc and the washer pickup units, the pin will engage a washer 40 disposed within the U-shaped opening formed in the washer carrying wheel. At this point of axial movement of the cylindrical pin 190, the internal diameter opening of the washer is entered by the end portion 199 of the pin until the washer is completely disposed about the cylindrical pin. Upon continued movement of the washer pickup means the washer is thereby transferred from the U-shaped opening 84 onto the washer carrying assembly and the washer slides downwardly on this pin into engagement with the surface 198 formed on the end portion of the plunger member. The cycle of operation of washer pickup continues at a fixed rate dependent upon the number of units disposed on the rotating framework of the bolt carrying and assembling device and the notches in the washer wheel are correspondingly arranged so that the spacing between the U-shaped openings is of an arcuate distance substantially equal to the distance between the pin members of adjacent washer pickup and assembling units.

The support plate 78 disposed axially adjacent the rotating washer carrying wheel 72 is correspondingly positioned so that interference with washer pickup will not occur. Therefore, a substantial portion of the plate is provided which insures axial support of the washer within the U-shaped groove prior to pickup by the reciprocable pin member from the washer pickup and assembling unit. Upon completion of the washer pickup portion of operation of the units and a washer has been disposed upon the pin member, the assembly of the washer with the bolt is ready for completion.

The feeding of the washers to the washer carrying wheel from the arrangement of the elements as herein set forth must occur at an interval on the rotating cycle of the washer carrying wheel prior to the overlapping portion of rotation with the rotating washer pickup and assembling mechanism; that is, washers must be supplied to the wheel prior to the arcuate intersection of these units in order that the U-shaped openings 84 in the wheel 72 contain washers ready for the pickup and transferring step. The feeding of the bolts to the bolt carrying and assembling mechanism can occur subsequent to the washer pickup or even prior to the washer pickup since the operation of the washer pickup does not interfere with the bolt pickup. From an analysis of the structural arrangement of these elements, simplicity in the structure of the bolt and washer pickup assembly dictates that the bolt be picked up subsequent to the washer pickup. At such time when a bolt is picked up by the semi-circular notch 138 formed in the lower slide 118 and the head 140 of the bolt rests upon the surface 142 thereof, a washer has been picked up by the pickup unit and at that time, is in engagement with the surface 198 on the conical end portion 194 of the plunger 154. Upon further rotation of these units, the bolt and the washer pickup units forming a part of the rotating assembly are by the nature of their location in axial alignment ready for the assembling step.

A typical assembling operation of one bolt and washer is described as follows. The pin and roller arrangement again plays an important part in the assembling operation in that a rise on the cam surface when engaged by the roller 158 directs the plunger assembly upwardly. Due to the predetermined axial alignment of these units as provided by the lower slide 118, the shank of the bolt 14 is engaged by the end 199 of the reciprocable pin member 190. At the point of engagement of the end of the shank portion of the bolt and the end of the reciprocable pin, the head of the bolt is axially moved into contact with the head 131 of the pin 130 axially spaced therefrom. The pin 130 reacts against the coil spring 134 and serves as a reaction member for the head of the bolt and maintains same in contact with the surface 142 on the lower slide. Upon further rotation of the assembling unit, the continued engagement of the roller 158 with the predetermined rise on the cam surface, axially directs the end portion of the plunger upwardly and in turn, the shank of the bolt directs or moves the reciprocable pin axially inwardly against the reaction of the coil spring 180 until the bolt shank is encompassed by the opening 192 formed in the end 194 of the plunger member 154. At such time as engagement of the shank of the bolt with the opening 192 occurs, the washer 40 is transferred from the cylindrical pin 190 to the shank of the bolt (from this arrangement, it can be seen that the diameter of the shank of the bolt is of necessity the same as that of the pin member) and accordingly, the washer is thereby transferred from the pickup unit to the bolt.

Figures 11, 12:
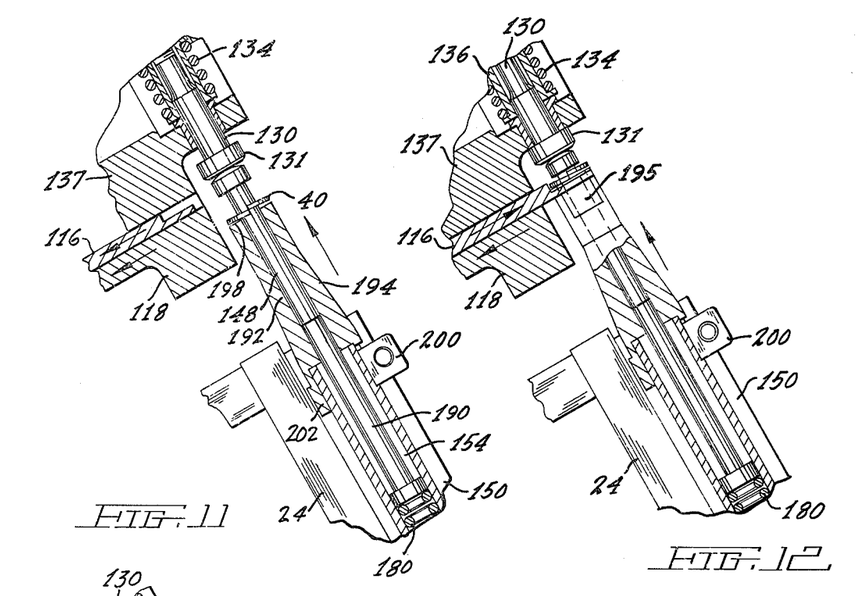
FIGURE 11 is a partial cutaway view of one of the washer pickup units and the bolt carrying means at the initial stage of the washer as transferred from the washer pickup means to the bolt.
FIGURE 12 is a side elevational view of the assembling machine illustrating the bolt carrying means and the component parts thereof which function to maintain the washer and bolt in an assembled relationship prior to the return of the washer pickup means for a subsequent pickup operation.
Figures 13, 14:
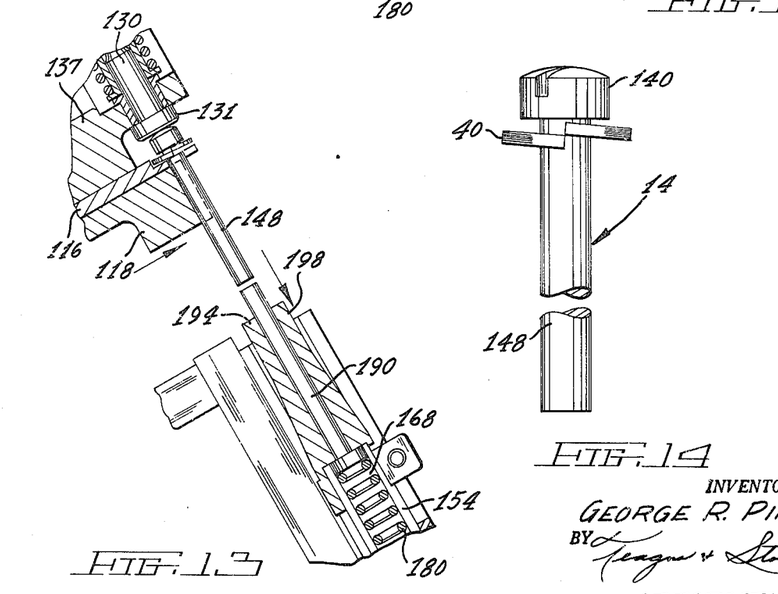
FIGURE 13 is a partial cross-sectional view of one of the washer pickup units and illustrates therein the return positioning of one of the washer pickup units for a subsequent pickup operation and further illustrates the component parts of the bolt carrying means which engages and maintains the bolt in proper alignment on the bolt carrying device.
FIGURE 14 is a view of the assembled bolt and washer and illustrates therein the positioning of the washer with respect to the bolt prior to its transfer from the assembling device to the thread roller.

Continued axial outward movement of the end 194 of the plunger member moves the washer axially upwardly toward the head of the bolt. At such time when the surface 198 is about to abut the lower slide member 118, assuming that prior to this time the lower slide is in engagement with the shank of the bolt functioning as a means to maintain proper alignment thereof with the pin member 130, the cam surfaces 108 and 114 of the plates 102 and 110, respectively, and the engagement thereof by the rollers 128 and 124, respectively, directs the upper and lower slides in a radially inward direction withdrawing the upper and lower slides, respectively, out of the path of axial movement of the end portion 194 of the plunger (FIG. 11). This movement of the upper and lower slides allows the end portion of the plunger to axially move the washer up to and into engagement with the head of the bolt. At such time when the washer is in engagement with the head of the bolt, the upper slide is moved radially outwardly by the corresponding roller and cam surface engagement of roller 128 in plate 102 until the U-shaped opening 146 in the upper slide 116 encompasses the lands 195 on the end portion 194 of the plunger (FIG. 12). The pair of parallel lands 195 on the end portion of the plunger member are spaced such that the distances between these parallel surfaces is less than the dimension of the width of the U-shaped opening. Upon radial movement of the upper slide, the lands on the end of the plunger are encompassed by the U-shaped groove 146 thereby positioning the washer axially above the upper slide. Upon continued rotation of the washer pickup and assembling unit, a fall surface (not shown) of the cam is engaged by the follower roller and accordingly, redirects the end portion 194 of the plunger member axially downwardly positioning the washer on the upper slide 116 (FIG. 13) and thereby allowing the compressive load on the spring 180 disposed in the chamber 168 of the plunger to force the pin member 190 axially outwardly until the pin is extended from the end of the plunger end surface 198 and is again in position for a subsequent washer pickup operation. At this point, the upper slide 116 maintains the bolt and washer in assembled form. Upon return of the plunger member to an axially spaced relationship with the end of the bolt, the lower slide through the relative cam surface 114 engagement of the roller 124, is directed radially outwardly wherein the semi-circular notch 138 formed therein again engages the shank of the bolt axially beneath the washer and thereby maintains the bolt in proper alignment on the bolt carrying device (FIG. 13). Therefore, at this point in the operation, the assembly of the washer and bolt has been completed and the washer is in position on the bolt shank adjacent the head portion thereof ready to be transferred from the assembling unit onto the respective thread rolling mechanism.

Figure 15:
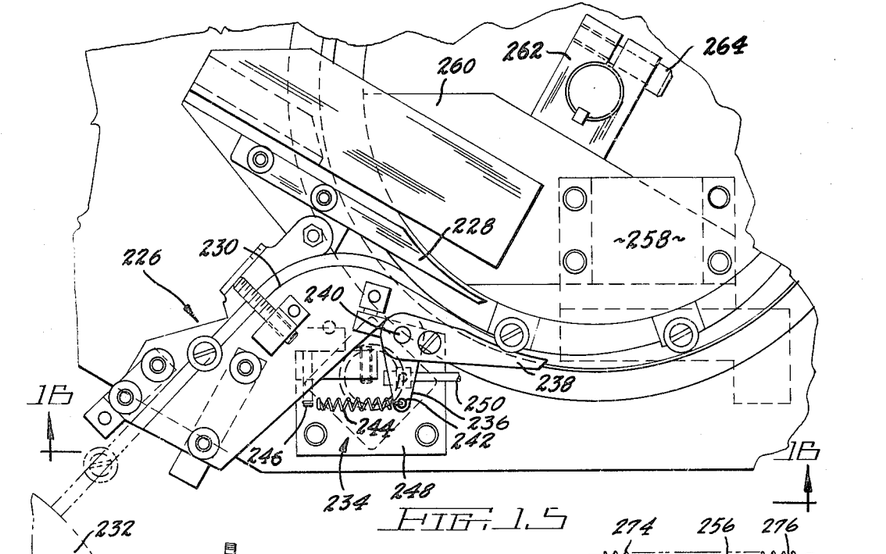
FIGURE 15 is a top elevational view of the bolt carrying means wherein the assembled washer and bolt are disposed on a portion of the means prior to being transferred therefrom for a subsequent thread rolling operation. This view further illustrates a top elevational view of the ejection means which functions to eject from the machine those bolts which have not been properly assembled with a washer.

The means for transferring the assembled washer and bolt from the bolt carrier to the thread roller comprises a ramp arrangement 226 (FIG. 15) secured to the housing 36 whereby a portion of the ramp comprises a fender 228 which extends in a radially inward direction toward the axis of rotation of the bolt carrying mechanism and is axially spaced above the plane of rotation of the bolt carrying mechanism. Upon continued rotation of the bolt carrier, the assembled washer and bolt disposed in the semi-circular notch 138 of the lower slide will engage the fender 228 and be guided therefrom onto the ramp 230 and thereafter gravitationally moved down the ramp into the receiving means 232 for the thread rolling operation. Upon completion of the thread rolling step, the finished product (FIG. 17) is deposited into the hopper 22 disposed at the end of the thread rolling mechanism.

In the event a washer is not placed on a bolt during the assembly operation, an ejection device 234 is provided which functions to remove the unassembled unit from the bolt carrier prior to its entrance to the ramp 230 leading to the thread roller. It can be readily understood that in the event a bolt is threaded before the washer has been disposed on the shank portion, the threading automatically removes the possibility of functioning as a means to maintain a washer on the bolt since the threading operation by displacing the metal of the shank to a diametral dimension slightly larger than the I.D. opening of the washer thereby prevents the washer from sliding out of assembled engagement with the bolt.

Figures 16, 17:
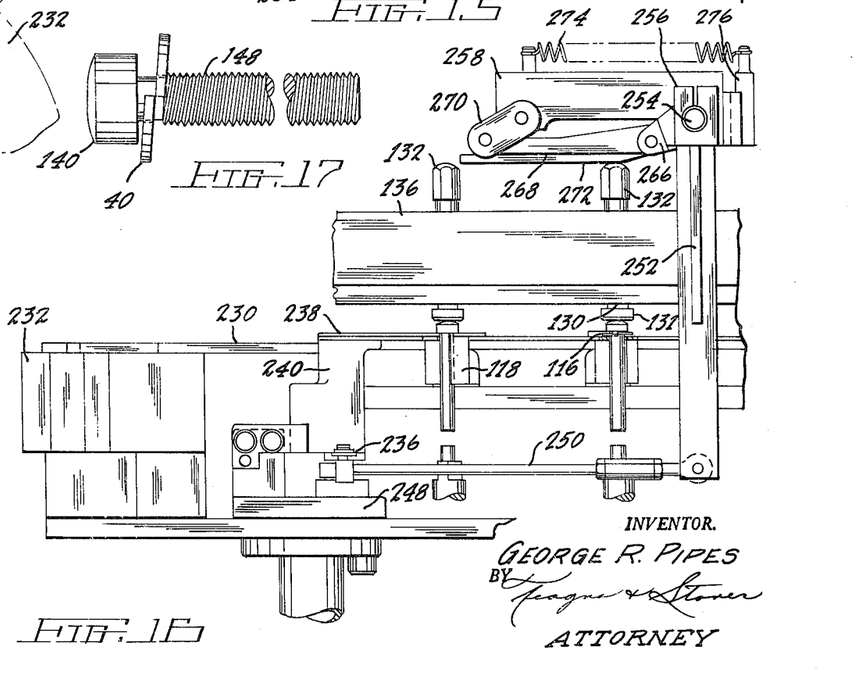
FIGURE 16 is a side elevational view of the ejection means taken along line 16—16 of FIGURE 15.
FIGURE 17 is a view of the completed washer and bolt assembly subsequent to the thread rolling operation wherein the displacement of the metal of the bolt shank is extended to a distance larger than the opening in the washer thus preventing the disassembly of the washer from the bolt.

The ejection device comprises a pair of interconnected pivotal arms 236 and 238 fixed to a pin 240 disposed between the arms. These arms lie adjacent the rotating bolt carrier with arm 238 being positioned axially above the plane of rotation of the carrier. The arm 236 has an opening 242 therein to which is secured one end of a coil spring 244. The other end of the coil spring is anchored to a pin 246 fixed to the base 248 which in turn is fixed to housing 36 whereby the coil spring functions to maintain arm 238 in a tangential relationship with the bolt carrying unit 12. Connected to one end of the arm 236 is linkage arm 250 which extends in a direction parallel to the axis of rotation of the bolt carrying unit and is in pivotal engagement with arm 252. Arm 252 is fixed to a pivot pin 254 located within a slotted support 256 forming a part of a base 258 of the spring loaded mechanism (FIG. 16). The base 258 is secured to a support plate 260 (FIG. 15) which extends in an arcuate manner axially spaced from the rotating bolt carrying assembly 12. The support plate is welded or fixed in any other suitable manner to a yoke 262 which has a pair of threaded openings therein adaptable to receive a bolt 264 whereby the bolt functions to secure the yoke and accordingly, the support plate to the stationary shaft 26.

Fixed to pin 254 and the support 256 is an arm 266 which has a plate 268 secured thereto. A second pivotal arm 270 is secured to the frame 258 and functions to hold the other end of the plate 268 at an angle parallel to the plane of rotation of the unit 12. The plate 268 has a surface 272 thereon engageable with one end of the pin head 132 and is responsive in its vertical positioning with respect to the bolt rotating assembly by the axial movement of the pin 130 imparted thereto. A coil spring 274 is anchored to the base 258 at one end thereof and to a pin 276 at the other end thereof. Pin 276 is fixed to the pivot 254 whereby the arm 266, the linkage arm 252 and the pin 276 conjointly pivot about the same axis. The coil spring 274 functions to maintain the plate 268 at a substantially lower height than the normal height of the pin head 132 when in engagement with an assembled bolt and washer such that the engagement of the plate surface 272 with the head 132 of an assembled bolt and washer maintains the arm 238 in a tangential relationship with the bolt carrying wheel. If a washer is not assembled with the bolt, the pin 130 height will be relatively lower such that the plate 268 will engage the head 132 at a lower level. Due to the decrease in reactive force acting to increase the tension on the spring, the resilient action thereof pivots the pin 276, arm 266, the plate 268 and the linkage 252 in a counterclockwise direction. By pivoting the unit about the pivot point 254, the linkage arm 252 in turn reciprocates linkage arm 250 and accordingly, arm 236, pin 240 and pivot arm 238 will be rotated counterclockwise whereby arm 238 is moved in a radially inward direction toward the axis of rotation of the bolt carrying mechanism (dotted lines FIG. 15). The arm 238 in this position acts as a fender and accordingly, upon engagement with the unassembled bolt guides the bolt from the semi-circular opening 138 in the lower slide and the U-shaped opening 146 in the upper slide into a suitable hopper or container (not shown) disposed adjacent the bolt carrying wheel. These bolts can be reapplied to the bolt feeder hopper 18 and again run through the assembling operation.

Upon continued rotation of the frame 24 where the subsequent bolt is properly assembled to a washer, the plate 268 is moved axially upwardly a distance equal to the thickness of the washer since the pin head 131 reacts against the increased height of the bolt head extending above the surface of the upper slide. Axial movement of the pin head 131 in turn causes head 132 to rise the corresponding amount and upon engagement of the plate 268 pivots the arm 266, the pin 276 and the linkage arm 252 in a clockwise direction placing spring 274 in tension. The movement of the linkage arm 252 in turn imparts movement of the reciprocable linkage arm 250 and pivots arm 236, pin 240 and arm 238 in a clockwise direction thereby instantaneously repositioning arm 238 so that it is in a tangential relationship with the rotating bolt carrying frame 24. With the arm 238 so disposed, the subsequent assembled bolt and washer unit is allowed to be carried in notch 138 and 146 until such time when the bolt head engages the fender 228 which thereupon guides the assembled unit from the bolt carrying unit onto the ramp 230 and in turn into the thread roller 20.

It is to be understood that the operation of each washer pickup and assembling unit as well as the transferring of an assembled unit or the ejection of an unassembled unit is identical. Therefore, the operational sequence in the assembly of the washer to the bolt occurs at a rate dependent on the number of individual units in the assembling mechanism as dictated by the desired size of the machine and the desired output rate.

While the present invention has been described in connection with certain specific embodiments, the principle involved is substantially capable of numerous other applications that would readily occur to persons skilled in the art. The nvention, therefore, is limited only as indicated by the scope of the appended claims.

I claim:

1. Apparatus for assembling fasteners with washers comprising:
   a rotatable frame means,
   means operable to effect rotation of said rotatable frame,
   fastener carrying means disposed on said rotatable frame means for carrying said fasteners parallel to the axis of rotation of said frame means,
   washer carrying means disposed on said frame means axially spaced from and in axial alignment with said fastener carrying means,
   means cooperable with said washer carrying means to impart axial movement to said washer carrying means to effect a unitary assembly of said fastener and washer, and
   radially moveable slide means, responsive to the rotation of said frame means, on said fastener carrying means for engaging said assembled fastener and washer effective to maintain said assembly in position for transfer from said apparatus.

2. Apparatus for assembling fasteners and washers comprising:
   a structure having a rotatable frame means,
   means operable to effect rotation of said rotatable frame means,
   means, including radially movable slide means, disposed on said rotatable frame means for carrying said fasteners parallel to the axis of rotation of said frame means, said slide means being responsive to rotation of said frame means to effect movement of said slide means,
   washer carrying means integral with said frame means and axially spaced from and in axial alignment with said fastener carrying means,
   said washer carrying means including means disposed in axial alignment with said fastener carrying means, so constructed and arranged to position and guide at least a portion of the internal surface of said washer on a portion of the outer surface of said fastener,
   means cooperable with said washer carrying means to impart axial movement to said washer carrying means to effect a unitary assembly of said fastener and said washer, and
   means for discharging said assembled fastener and washer from said apparatus.

3. Apparatus for assembling fasteners and washers comprising:
   a rotatable frame means,
   means operable to effect rotation of said rotatable frame means,
   fastener carrying means, including reciprocating slide means disposed on said rotatable frame means for carrying said fasteners parallel to the axis of rotation of said frame means, said slide means having means responsive to rotation of said frame means to effect reciprocal movement thereof, washer carrying means disposed on said frame means axially spaced and in axial alignment with said fastener carrying means, means cooperable with said washer carrying means to impart axial movement to said washer carrying means to effect the unitary assembly of said fastener and washer, and means cooperable with said slide means to transfer the assembled washer and fastener from said apparatus.

4. Apparatus for assembling fasteners with washers compromising:

a rotatable frame means, means operable to effect rotation of said rotatable frame means, including reciprocally movable slide means, disposed on said rotatable frame means for carrying said fasteners parallel to the axis of rotation of said frame means, said slide means being responsive to rotation of said frame means to effect movement of said slide means.

washer carrying means disposed on said frame means axially spaced from and in axial alignment with said fastener carrying means, means cooperable with said washer carrying means to impart axial movement to said washer carrying means to effect a unitary assembly of said fastener and washer, and discharge means adjacent said rotatable frame means so constructed and arranged to direct the assembled fastener and washer from said rotatable frame means.

5. Apparatus for assembling fasteners and washers comprising a housing having a rotatable frame means, said frame means having a first and second radially moveable slide means disposed adjacent the periphery of said frame means for supporting said fasteners, means for moving said first slide means into engagement with said fastener during the assembly operation, a washer carrying mechanism comprising:

a chamber disposed on said rotating frame means and in axial alignment with said fastener supporting means, pin means having a portion of which is telescoped in said chamber and axially aligned with said fastener supporting means, said pin means so constructed and arranged to initially position and axially align said washer with respect to said fastener, said washer carrying mechanism including means to position said washer upon said fastener, said second radially moveable slide means adapted to engage said fastener and washer assembly; and means cooperable with said second slide means to transfer the assembled washer and bolt from said apparatus.

6. Apparatus for assembling fasteners with washers comprising:

a rotatable frame means, means operable to effect rotation of said rotatable frame means, means disposed on said rotatable frame means for carrying said fasteners parallel to the axis of rotation of said frame means, washer carrying means disposed on said frame means axially spaced and in axial alignment with said fastener carrying means, means cooperable with said washer carrying means to impart axial movement to said washer carrying means to effect a unitary assembly of said fastener and washer, said washer carrying means including land means disposed adjacent that portion of said washer carrying means which contacts said washer, radially moveable slide means having a configuration which is complementary to and cooperates with said land means to engage said fastener and washer assembly, and means cooperable with said radially moveable slide means, to transfer the assembled washer and fastener from said machine.

7. Apparatus for assembling fasteners with washers comprising:

a rotatable frame means, means operable to effect rotation of said rotatable frame means, means disposed on said rotatable frame means for carrying said fasteners parallel to the axis of the rotation of said frame means, washer carrying means disposed on said frame means axially spaced from and in axial alignment with said fastener carrying means, means cooperable with said washer carrying means to impart axial movement to said washer carrying means to effect a unitary assembly of said fastener and washer, land means integral with said washer carrying means, said land means being disposed adjacent that portion of the washer carrying means which contacts said washer, said means for carrying said fasteners including reciprocally movable slide means disposed thereon, said land means on said washer carrying means having a configuration which cooperates with a portion of said slide means whereby said washer is removed from said washer carrying means and assembled with said fastener, and said reciprocally movable slide means being responsive to rotation of said frame means to actuate said slide means, to maintain said fastener and washer assembly in position for transfer from said apparatus, and means cooperable with said slide means to transfer the assembled fastener and washer from said apparatus.

8. A machine for assembling bolts with washers comprising a base, a rotatable frame fixed to said base, bolt carrying means disposed on said frame, bolt feeding means disposed adjacent said frame operable to supply said bolts to said bolt carrying means, washer carrying and assembling means disposed on said frame parallel to the axis of rotation thereof and axially spaced from and in alignment with said bolt carrying means and being capable of axial movement with respect to said frame, actuating means engageable with said washer carrying and assembling means operable to effect said axial movement and means connected to said frame effecting rotation thereof, said washer carrying and assembling means comprising an axially reciprocable means responsive to said actuating means, washer feeding means disposed adjacent said frame operable to supply washers thereto, said axially movable reciprocable means engageable with said washer feeding means responsive to said actuating means operable to effect washer pickup with said washer carrying and assembling means being operable to transfer said washer from said washer feeding means onto said reciprocable means and from said reciprocable means onto said bolt thereby effecting said assembly of said washer and bolt, and radially movable slide means on said bolt carrying means for engaging said assembled bolt and washer effective to maintain said assembly in position for transfer from said machine.

9. A machine for assembling bolts with washers according to claim 8 wherein said actuating means comprises a stationary housing having a cam surface formed thereon, said cam surface being radially coincident with a follower means formed from said washer carrying and assembling means whereby the axis of rotation of said rotatable frame is coincident with the origin of the annular groove forming said cam surface.

10. A machine for assembling bolts with washers according to claim 8 wherein said washer feeding means comprises a multiplicity of circumferentially spaced, substantially U-shaped grooves therein rotating in a plane axially spaced intermediate said bolt carrying means and said washer carrying and assembilng means with said U-shaped openings being in axially spaced alignment with said bolt carrying means and said washer carrying and assembling means during a portion of the operation of said mechanism.

11. A machine for assembling bolts with washers comprising a base, a rotatable frame fixed for movement on said base, bolt and washer carrying and assembling units disposed on said frame parallel to the axis of rotation thereof, said washer carrying and assembling units being axially movable on said frame and cooperable with said bolt carrying units responsive to actuation of said washer carrying and assembling units operable to effect assembly of said washer with said bolt, actuating means engageable with each of said washer carrying and assembling units operable to effect said axial movement and means operable to rotate said frame, each of said washer carrying and assembling units comprising a reciprocable plunger member and a reciprocable pin member, said plunger member being engageable with said actuating means, said pin member being engageable with said plunger member and responsive to movement of said plunger member, bolt and washer feeding means disposed adjacent said frame, said pin member being engageable with said washer feeding means effective to transfer a washer from said feeding means to said washer carrying and assembling unit upon reciprocation of said pin member, said bolt carrying means comprising radially movable slide means disposed in said frame member operable to engage said bolt and washer upon assembly, said slide means being responsive to rotation of said frame to actuate said slide means and means cooperable with said radially movable slide means to transfer the assembled washer and bolt from said machine.

References Cited by the Examiner
UNITED STATES PATENTS

| | | | |
|---|---|---|---|
| 2,792,578 | 5/57 | Autio | 10—155 |
| 2,878,556 | 3/59 | Heidergott et al. | 10—155 |
| 2,996,738 | 8/61 | Wilson | 10—155 |
| 3,024,523 | 3/62 | Donaldson | 10—155 |
| 3,052,969 | 9/62 | Loven | 29—211 |
| 3,100,307 | 8/63 | Hatherell et al. | 10—155 |

ANDREW R. JUHASZ, *Primary Examiner.*

UNITED STATES PATENT OFFICE
CERTIFICATE OF CORRECTION

Patent No. 3,212,114                                      October 19, 1965

George R. Pipes

It is hereby certified that error appears in the above numbered patent requiring correction and that the said Letters Patent should read as corrected below.

Column 2, line 51, for "aembled" read -- assembled --; column 3, line 21, for "devcie" read -- device --; column 4, line 47, for "220" read -- 20 --; column 7, line 10, for "FIGS." read -- FIG. --; column 12, line 20, for "nvention" read -- invention --; column 13, line 18, before "including" insert -- means --; column 14, line 9, for "machine" read -- apparatus --.

Signed and sealed this 27th day of September 1966.

(SEAL)
Attest:

ERNEST W. SWIDER                                                            EDWARD J. BRENNER
Attesting Officer                                                           Commissioner of Patents